US006928625B2

(12) United States Patent
Makinen

(10) Patent No.: US 6,928,625 B2
(45) Date of Patent: Aug. 9, 2005

(54) SYSTEMS AND METHODS FOR MANAGING PROCESS CONTROL IN A GRAPHICAL USER INTERFACE

(75) Inventor: Bruce Allan Makinen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 630 days.

(21) Appl. No.: 09/998,466

(22) Filed: Nov. 29, 2001

(65) Prior Publication Data

US 2003/0098890 A1 May 29, 2003

(51) Int. Cl.[7] .............................. G06F 3/14; G06F 17/00
(52) U.S. Cl. ..................... 715/822; 715/811; 715/965; 715/709; 715/821; 715/812; 715/823; 700/83; 700/89; 700/110
(58) Field of Search .............................. 345/810, 964, 345/771, 822, 821, 811, 812, 825, 823, 965, 840, 835, 705, 708, 709; 700/83, 86, 87, 108, 103, 105, 95, 96, 110, 109

(56) References Cited

U.S. PATENT DOCUMENTS

| 5,008,810 A | * | 4/1991 | Kessel et al. ............. 700/86 X |
| 5,442,746 A | * | 8/1995 | Barrett .................... 345/835 X |
| 5,877,961 A | * | 3/1999 | Moore .................... 700/110 X |
| 6,058,333 A | | 5/2000 | Klein et al. .................... 700/83 |
| 6,272,390 B1 | * | 8/2001 | Skovgaard .................. 700/103 |
| 6,286,137 B1 | | 9/2001 | Bleizeffer et al. |
| 6,456,304 B1 | * | 9/2002 | Angiulo et al. ......... 345/825 X |
| 2002/0154153 A1 | * | 10/2002 | Messinger et al. .......... 345/705 |
| 2003/0065705 A1 | * | 4/2003 | Santos-Gomez ........ 345/708 X |

FOREIGN PATENT DOCUMENTS

| DE | 197 81 850.1-53 | 10/2003 |
| EP | 1 134 635 | 2/2001 |
| EP | 1 193 599 | 9/2001 |
| GB | 2 017 341 | 2/1979 |
| GB | 2 321 978 | 9/1997 |

* cited by examiner

Primary Examiner—Raymond J. Bayerl

(57) ABSTRACT

Systems and methods for managing process control in a graphical user interface are provided. One embodiment is a method for managing process control in a graphical user interface. Briefly described, one such method comprises the steps of: displaying a plurality of objects on a graphical user interface, each of the objects corresponding to one or more steps in a sequential process; in response to the proper object in the sequential process being selected and the corresponding step being successfully completed, visually distinguishing the object to indicate that the corresponding step has been successfully completed; and in response to one of the objects corresponding to a previously completed step being selected and successfully completed, performing the following steps: determining whether any other previously completed steps are dependent on the changes made in the previously completed step; and visually distinguishing the objects corresponding to the other previously completed steps to indicate that they are to be completed again.

20 Claims, 14 Drawing Sheets

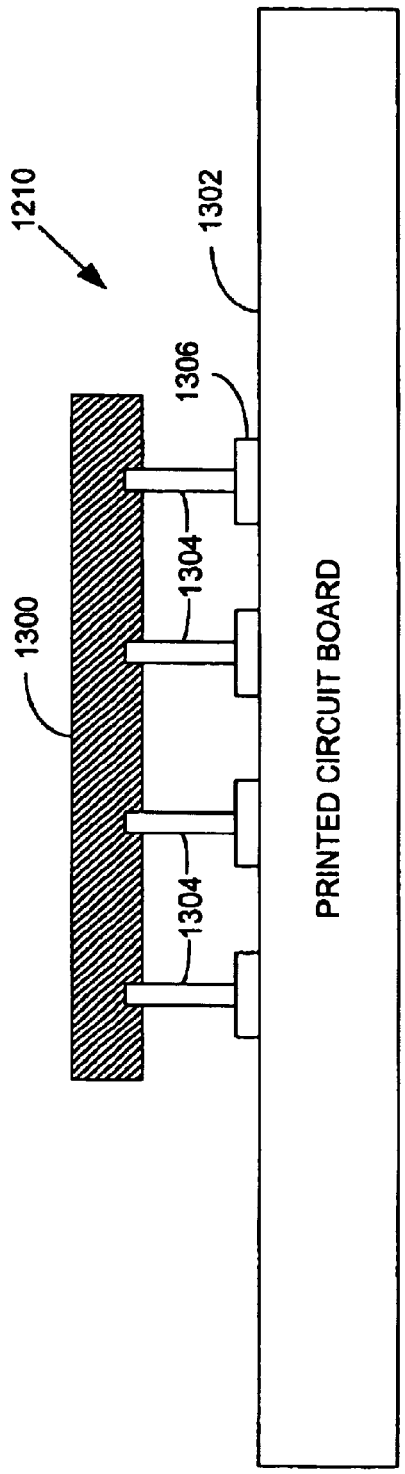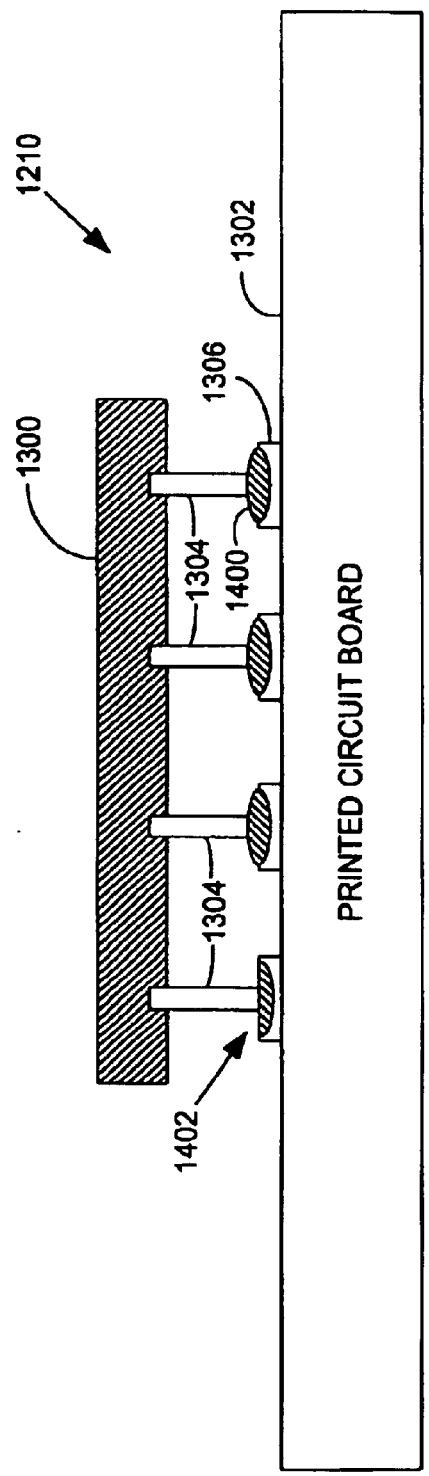

SYSTEMS AND METHODS FOR MANAGING PROCESS CONTROL IN A GRAPHICAL USER INTERFACE

TECHNICAL FIELD

The present invention is generally related to computer applications having a graphical user interface (GUI) and, more particularly, is related to systems and methods for managing process control in a graphical user interface.

BACKGROUND OF THE INVENTION

Currently, there are a variety of computer applications that provide a graphical user interface for controlling the manner in which a user performs one or more steps in a sequential process. Generally, these computer applications display one or more objects, in which each object corresponds to a particular step (or steps) in the process. In this manner, the user may select the object corresponding to a first step and complete the step. When the step is completed, the corresponding object may be marked as complete. After the first step is completed, an object corresponding to a second step may be selected, and so on.

Existing systems may be inadequate, however, where the process being controlled is complicated. For example, currently, a variety of automated systems and/or processes are used for inspecting manufacturing defects in printed circuit boards. Printed circuit boards typically include one or more electrical components (e.g., computer chips, capacitors, etc.) soldered to an integrated circuit (IC). Such inspection systems typically comprise a printed circuit board modeling system, an imaging system, and a control system. Typically, the modeling system is used to generate a computer model of a printed circuit board that is to be mass-produced. The imaging system comprises hardware and/or software for capturing an image of the manufactured printed circuit board. Currently, image systems employ a variety of imaging techniques (e.g., x-ray, optical, ultrasonic, thermal image, etc.). The control system typically receives a file containing a computer model of the particular printed circuit board from the modeling system. Based on the computer model, the control system may generate an inspection program to be implemented by the imaging system. The inspection program may be used to image a manufactured printed circuit board, which is based on the computer model generated by the modeling system. After the imaging system generates the images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Control systems implemented in current PCB inspection systems typically employ a graphical user interface to assist a user in the process of generating the inspection program to be implemented by the imaging system and for interfacing with the PCB modeling system. These processes are often very complicated and may be very problematic to implement in existing systems. For instance, existing systems are not capable of displaying and/or controlling dependencies between two or more process steps. Consider a situation in which a process being managed comprises the following steps: "Process Step 1," "Process Step 2," "Process Step 3," and "Process Step 4." The computer application may display objects corresponding to each of these steps. In this example, a user may select each object and complete the corresponding step, in which case the object is marked as complete. Now assume the user desires to perform "Process Step 1" again. Existing systems do enable a user to repeat previously completed steps. However, where dependencies exist between steps, existing systems are very problematic. For instance, if "Process Step 2" and "Process Step 4" are dependent on "Process Step 1" and a user repeats "Process Step 1," existing systems have no way of accounting for the dependency.

Thus, there is a need in the industry for systems and methods for managing process control in a graphical user interface.

SUMMARY OF THE INVENTION

The present invention provides systems and methods for managing process control in a graphical user interface.

One embodiment of the present invention is a method for managing process control in a graphical user interface. Briefly described, one such method comprises the steps of: displaying a plurality of objects on a graphical user interface, each of the objects corresponding to one or more steps in a sequential process; in response to the proper object in the sequential process being selected and the corresponding step being successfully completed, visually distinguishing the object to indicate that the corresponding step has been successfully completed; and in response to one of the objects corresponding to a previously completed step being selected and successfully completed, performing the following steps: determining whether any other previously completed steps are dependent on the changes made in the previously completed step; and visually distinguishing the objects corresponding to the other previously completed steps to indicate that they are to be completed again.

Another embodiment of the present invention is a system for managing process control in a graphical user interface. Briefly described, one such system comprises logic, a processing device configured to implement the logic, and a display device configured to support the graphical user interface. The logic is configured to: display a plurality of objects on a graphical user interface, each of the objects corresponding to one or more steps in a sequential process; in response to the proper object in the sequential process being selected and the corresponding step being successfully completed, visually distinguish the object to indicate that the corresponding step has been successfully completed; and in response to one of the objects corresponding to a previously completed step being selected and successfully completed, perform the following steps: determine whether any other previously completed steps are dependent on the changes made in the previously completed step; and visually distinguish the objects corresponding to the other previously completed steps to indicate that they are to be completed again.

Another embodiment of the present invention is a computer program embodied in a computer-readable medium for managing process control in a graphical user interface. Briefly described, one such computer program comprises logic configured to: display a plurality of objects on a graphical user interface, each of the objects corresponding to one or more steps in a sequential process; in response to the proper object in the sequential process being selected and the corresponding step being successfully completed, visually distinguish the object to indicate that the corresponding step has been successfully completed; and in response to one of the objects corresponding to a previously completed step being selected and successfully completed, perform the following steps: determine whether any other previously completed steps are dependent on the changes made in the previously completed step; and visually distinguish the objects corresponding to the other previously completed steps to indicate that they are to be completed again.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 13 is a block diagram illustrating a printed circuit board that may be inspected by the system of FIG. 12.

FIG. 14 is a block diagram illustrating a printed circuit board that may be inspected by the system of FIG. 12, which has a manufacturing defect.

DETAILED DESCRIPTION

Figure 1:
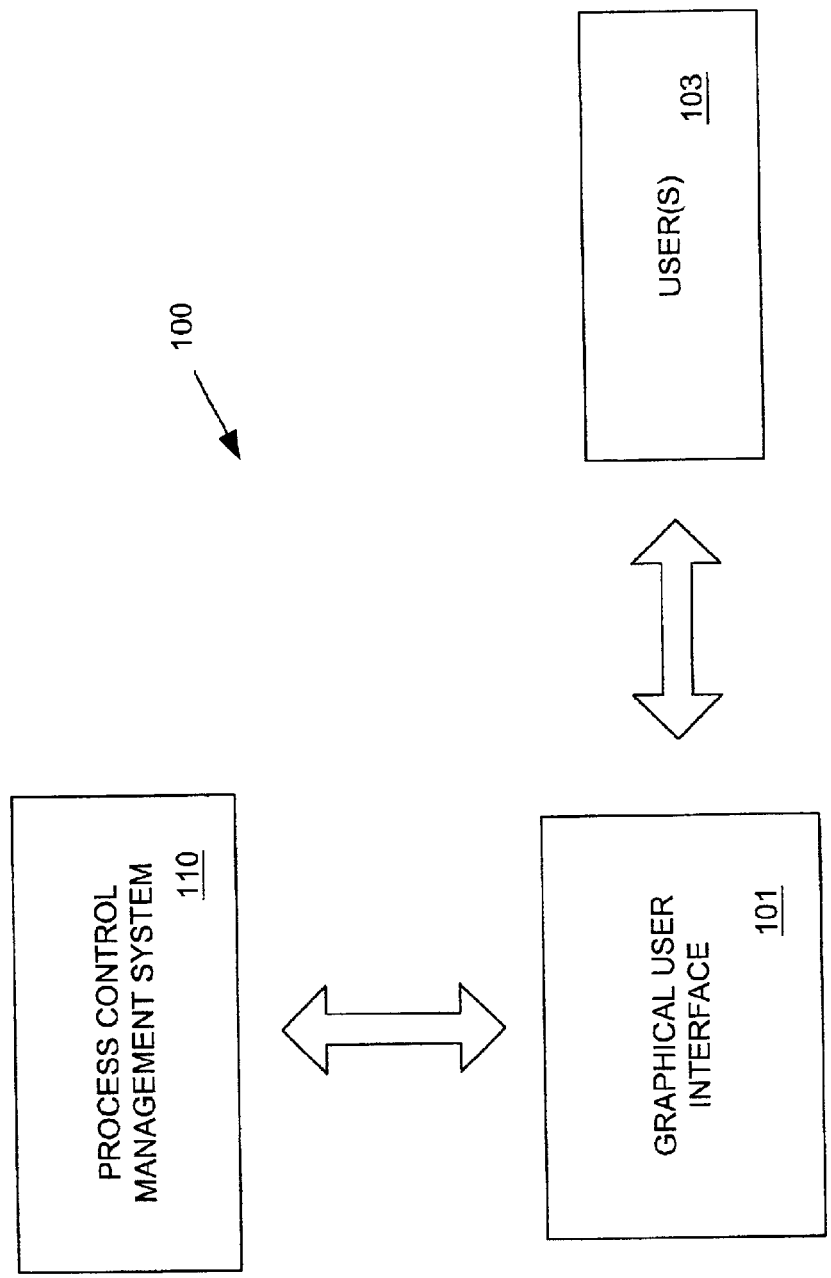
FIG. 1 is a high-level block diagram of a system in which an embodiment of a process control management system of the present invention may be implemented

FIG. 1 is a block diagram of a system 100 in which an embodiment of a process control management system 110 of the present invention may be implemented. As illustrated in FIG. 1, process control management system 110 works in cooperation with a graphical user interface 101 to enable one or more users 103 to perform one or more steps corresponding to a particular process. In general, process control management system 110 manages the manner in which the user 103 interacts with the process steps to be completed via the graphical user interface 101. One of ordinary skill in the art will appreciate that the particular steps to be completed and the general nature of the process being controlled by process control management system 110 is not critical. For example, process control management system 110 may manage any type of process, such as the process of preparing a personal income tax return, a manufacturing process, etc.

Figure 2:
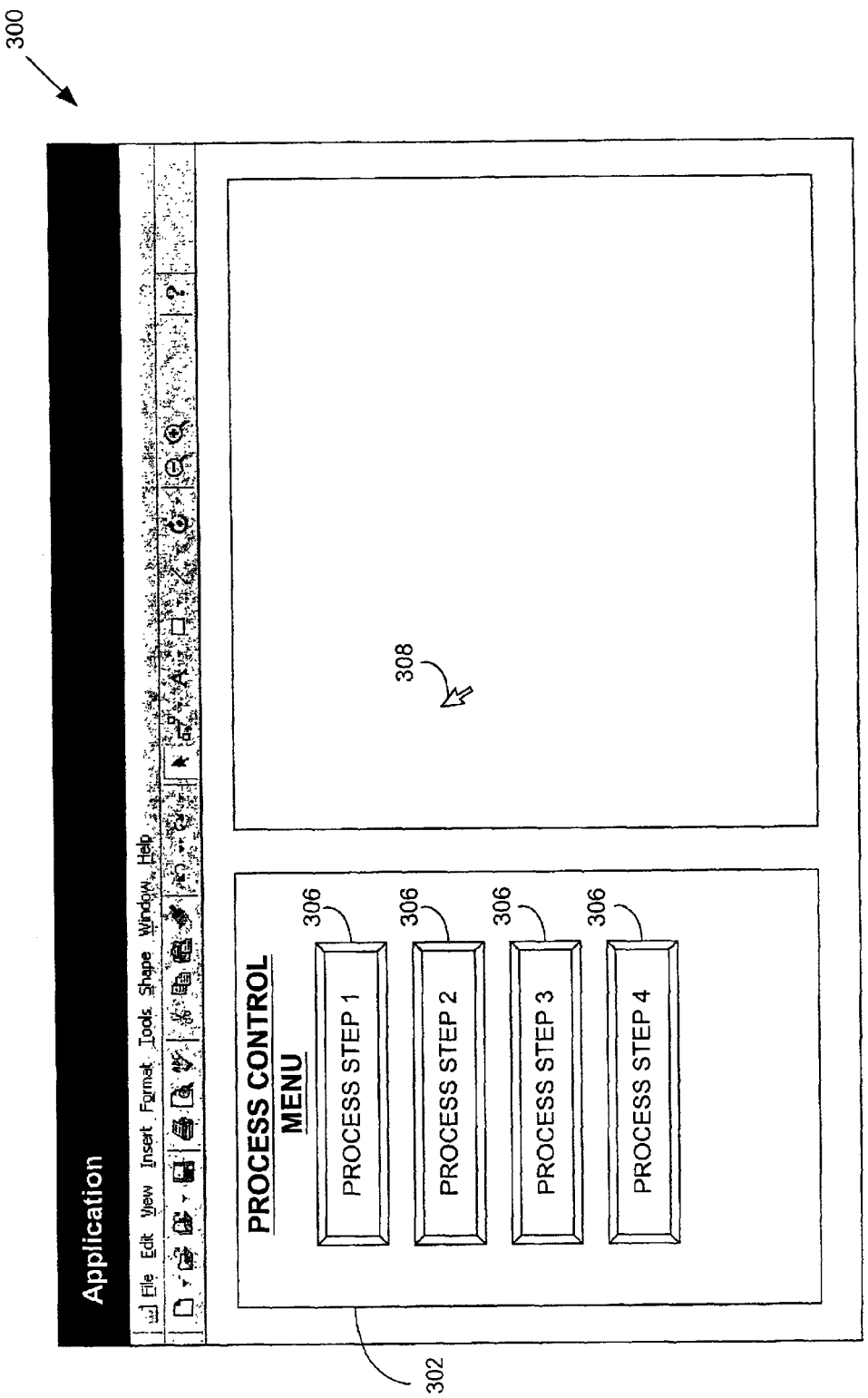
FIG. 2 is a screen shot of an embodiment of a graphical user interface illustrating an implementation of an embodiment of the process control management system of FIG. 1.

By way of example, FIG. 2 is a screen shot 300 of an embodiment of a graphical user interface 101 illustrating an implementation of process control management system 110. Process control management system 110 may provide a process control menu 302 in a portion of a display screen that is in communication with graphical user interface 101. Process control menu 302 provides the main control menu corresponding to a particular process which is to be controlled by process control management system 110 and with which a user 103 interacts to complete one or more steps in the process. Accordingly, in the embodiment illustrated in FIG. 2, process control menu 302 comprises at least one object 306, each of which correspond to one or more steps in the particular process that are to be controlled by process control management system 110 and completed by user 103.

For instance, consider a situation in which process control management system 110 is configured to manage the process of preparing an income tax return for a user 103. In this example, process control menu 302 may comprise a plurality of objects 306, each corresponding to a particular step in the process of preparing an income tax return to be performed by user 103. For example, process control menu 302 may comprise an object 306 for each of the following steps: obtain filing status; identify tax year; obtain wages/salary; calculate taxable income; determine adjusted gross income; obtain deductions; obtain exemptions; calculate taxable income; calculate total tax; obtain credits; calculate tax owed, etc. Each of the objects 306 may comprise text information identifying the particular step to which it corresponds. Generally, an object 306 may be any item in the graphical user interface that may be individually, or otherwise, selected and/or manipulated by the user 103. For example, objects 306 may comprise text, shapes, pictures, etc.

As illustrated in the embodiment illustrated in FIG. 2, objects 306 may be configured as virtual buttons that may be selected by the user 103. When the object 306 is selected, process control management system 110 (or another computer application working in cooperation with process control management system 110) may facilitate completion of the corresponding step(s). For instance, process control management system 110 may control a manufacturing process, in which case the step corresponding to a particular object 306 may be automatically completed when the corresponding object 306 is selected. In alternative embodiments, the process being controlled may be configured such that an object 306 may have more than one corresponding step. Thus, process control management system 110 may be configured to enable the user to select an object 306 and then interact with one or more sub-steps. For instance, in the above example where the process involves preparing a tax return, the user 103 may select an object 306 entitled "obtain wages/salary." After the object 306 is selected, process control management system 110 may be configured to receive related information (e.g., W-2 data, etc.) from the user 103. In this manner, the process control menu 302 provides a central point of control and other sub-steps may be completed, for example, in other portions of the graphical user interface 101 (e.g., in another window, a pop-up window, etc.).

As illustrated in FIG. 2, process control menu 302 may be presented to the user in a window of the graphical user interface. One of ordinary skill in the art will appreciate, however, that process control menu 302 need not be presented in a graphical user interface or a window. In fact, process control management system 110 may be configured to present process control menu 302 to the user in any format on a display device.

Figure 3:
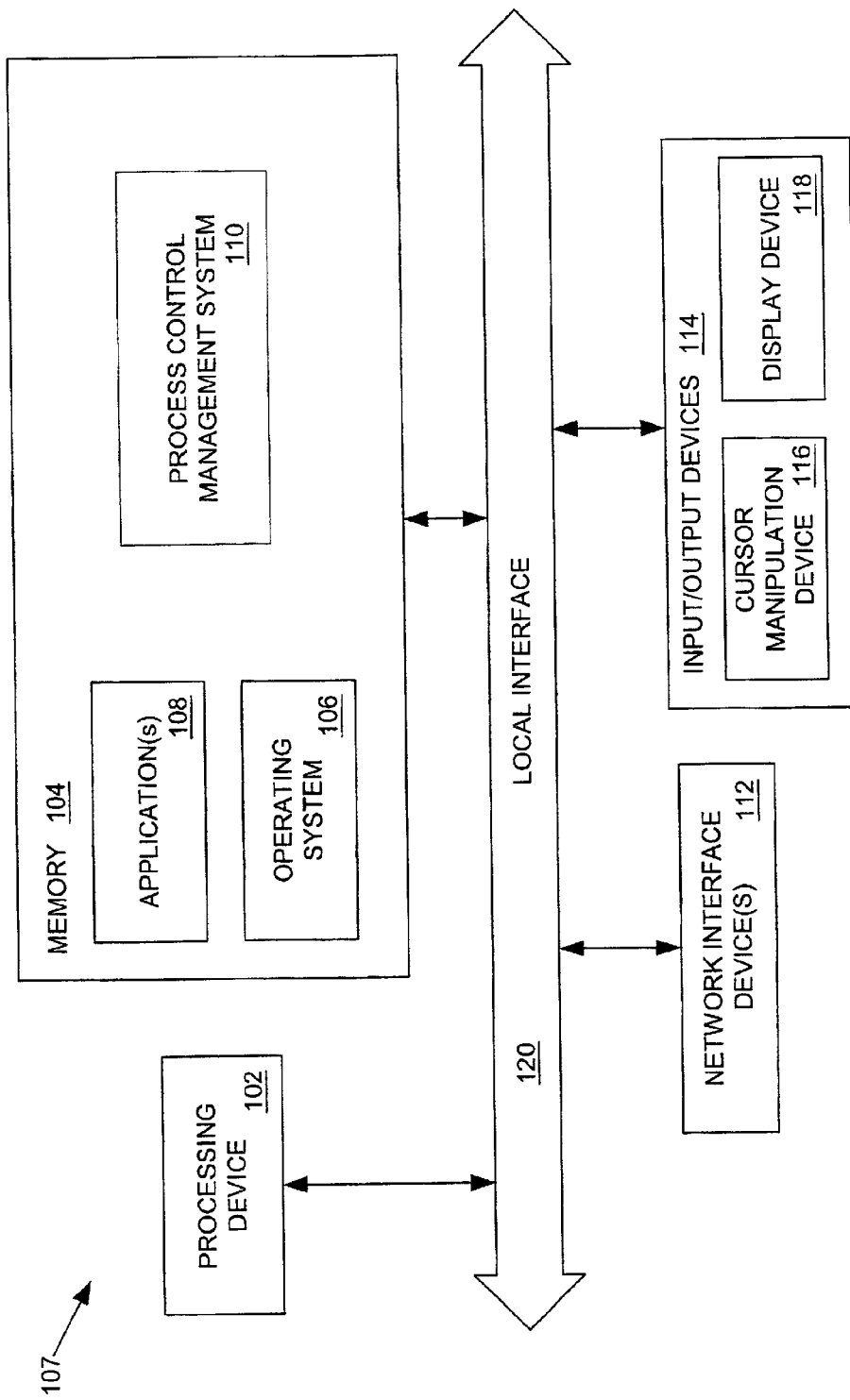
FIG. 3 is a block diagram of another embodiment of a system including an embodiment of the process control management system of FIG. 1.

FIG. 3 is a block diagram of an embodiment of a system 107 for implementing process control management system 110. Process control management system 110 may be implemented in software, firmware, hardware, or a combination thereof. In the embodiment illustrated in FIG. 3, process control management system 110 is implemented in software, as an executable program, which is executed by a processing device 102. Generally, in terms of hardware architecture, as shown in FIG. 3, system 107 comprises a processing device 102, memory 104, one or more network interface devices 112, and one or more input and/or output (I/O) devices 114 interconnected via a local interface 120. System 107 may further comprise additional components not illustrated in FIG. 3.

Referring again to FIG. 3, the various components of system 107 will be described. Local interface 120 may be, for example but not limited to, one or more buses or other wired or wireless connections. The local interface 120 may have additional elements, which are omitted for simplicity, such as controllers, buffers (caches), drivers, repeaters, and receivers, to enable communications. Furthermore, the local interface 120 may include address, control, and/or data connections to enable appropriate communications among the aforementioned components.

Processing device 102 is a hardware device for executing software, particularly that stored in memory 104. Processing device 102 may be any custom-made or commercially-available processor, a central processing unit (CPU), an auxiliary processor among several processors associated with system 100, a semiconductor based microprocessor (in the form of a microchip or chip set), a macroprocessor, or generally any device for executing software instructions.

As illustrated in FIG. 3, memory 104 may comprise an operating system 106, one or more applications 108, and process control management system 110. The architecture, operation, and/or functionality of process control management system 110 will be described in detail below. Memory 104 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 104 may incorporate electronic, magnetic, optical, and/or other types of storage media. Furthermore, memory 104 may have a distributed architecture, in which various components are situated remote from one another, but can be accessed by processing device 102.

The software in memory 104 may include one or more separate programs, each of which comprises executable instructions for implementing logical functions. In the example of FIG. 2, the software in memory 104 includes process control management system 110 according to the present invention. Memory 104 may further comprise a suitable operating system 106 that controls the execution of other computer programs, such as one or more applications 108 and process control management system 110, and provides scheduling, input-output control, file and data management, memory management, and communication control and related services.

Process control management system 110 may be a source program, executable program (object code), script, or any other entity comprising a set of instructions to be performed. When implemented as a source program, then the program needs to be translated via a compiler, assembler, interpreter, or the like, which may or may not be included within the memory 104, so as to operate properly in connection with operating system 106. Furthermore, process control management system 110 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

Network interface device(s) 112 may be any device configured to facilitate communication between system 107 and a communication network, such as a public or private packet-switched or other data network including the Internet, a circuit switched network, such as the public switched telephone network, a wireless network, an optical network, or any other desired communications infrastructure.

Input/output devices 114 may comprise any device configured to communicate with local interface 120. One of ordinary skill in the art will appreciate that, depending on the configuration of system 107, input/output devices 120 may include any of the following, or other, devices: a keyboard, a mouse, display device, such a computer monitor, a serial port, a parallel port, a printer, speakers, a microphone, etc.

As illustrated in FIG. 3, system 107 may include a cursor manipulation device 116 and a display device 118. As described in detail below, process control management system 110 works in cooperation with a graphical user interface 101 to enable one or more users 103 to perform one or more steps corresponding to a particular process. Accordingly, the user 103 may interact with process control management system 110 via display device 118 and cursor manipulation device 116. Thus, one of ordinary skill in the art will appreciate that display device 118 may comprise any of the following (or other) types of devices configured to support the graphical user interface: a computer monitor, a liquid crystal display (LCD), a plasma-based display, an LED-based display, a touch-sensitive screen, such as those implemented in portable computing devices (e.g., a personal digital assistant (PDA)), and any other known or future display device, regardless of the underlying display technology. Furthermore, cursor manipulation device 116 may comprise any input device configured to cooperate with an application 108, operating system 106, and/or process control management system 110 and manipulate a cursor displayed on the display device 118. For example, cursor manipulation device 116 may comprise a mouse, a trackball, a set of navigation keys (e.g., arrow keys), and a joystick stick, to name a few.

During operation of system 107, the processing device 102 is configured to execute logic stored within the memory 104, to communicate data to and from the memory 104, and to generally control operations of the system 107 pursuant to the software. Process control management system 110 and operating system 106, in whole or in part, but typically the latter, are read by the processing device 102, perhaps buffered within the processing device 102, and then executed.

In embodiments where process control management system 110 is implemented in software, as is shown in FIG. 3, process control management system 110 may be stored on any computer-readable medium for use by or in connection with any computer related system or method. In the context of this document, a computer-readable medium may be an electronic, magnetic, optical, or other physical device or means that may contain or store a computer program for use by or in connection with a computer-related system or method. Process control management system 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where process control management system 110 is implemented in hardware, process control management system 110 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
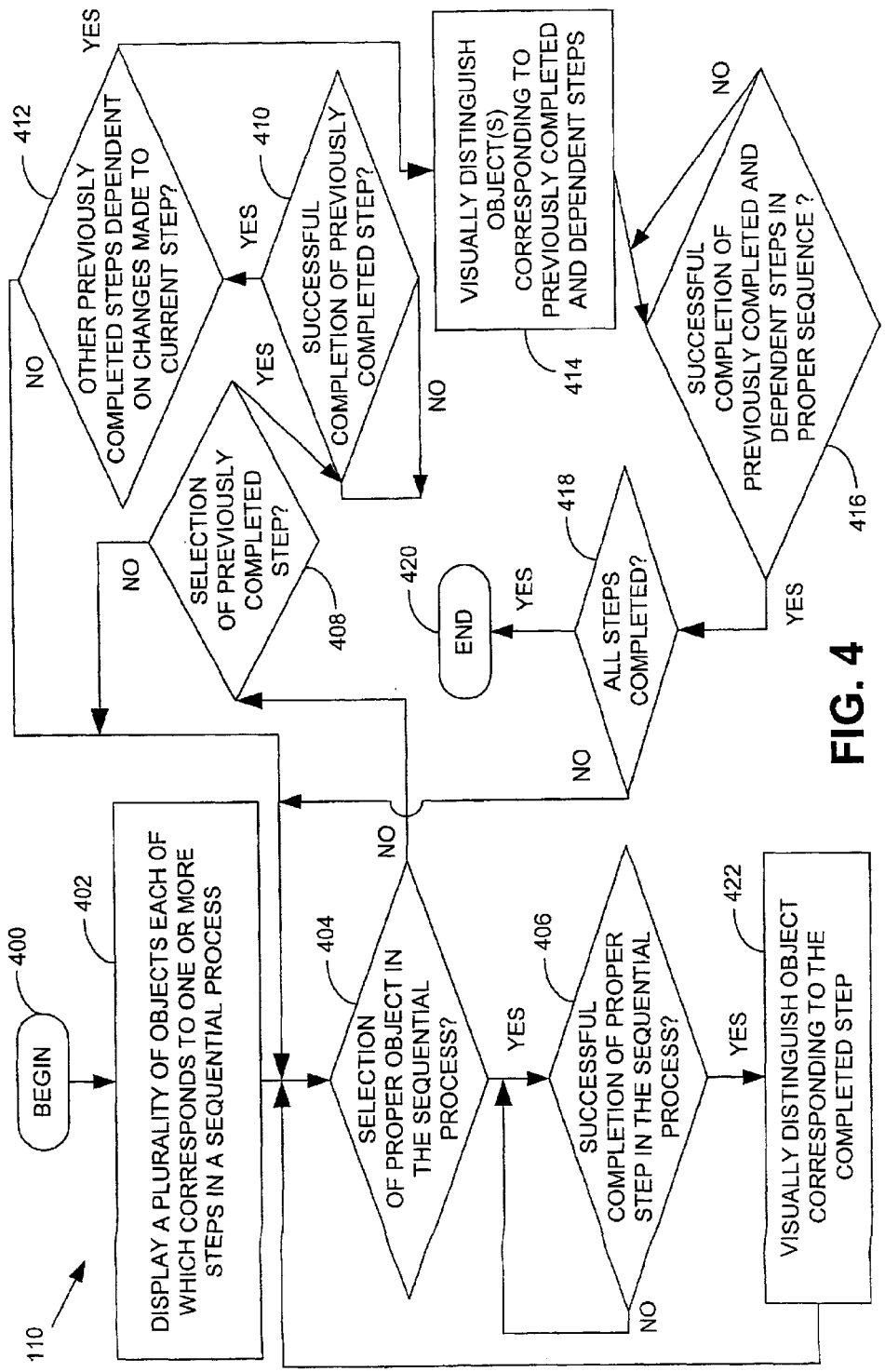
FIG. 4 is a flow chart illustrating the functionality, architecture, and/or operation of an embodiment of the process control management system of FIGS. 1 & 3.

FIG. 4 is a flow chart illustrating the architecture, functionality, and/or operation of an embodiment of process control management system 110. Process control management system 110 begins at block 400. Process control management system 110 may be initiated by a user via an I/O device 114. In certain embodiments, process control management system 110 may be implemented as a function that may be called by operating system 106 and an application 108. In alternative embodiments, the functionality of process control management system 110 may be seamlessly implemented within an application 108.

Regardless of the manner in which it is initiated, at block 402, process control management system 110 displays a plurality of objects 306, each of which corresponds to one or more steps in a sequential process. As described above, process control management system 110 may be configured to control any type of process. At decision block 404, process control management system 110 determines whether the proper object 306 in the sequential process has been selected. For example, referring to FIG. 2, consider a sequential process comprising the following steps: "Process Step 1," "Process Step 2," "Process Step 3," and "Process Step 4." Upon initiation of process control management system 110, the proper object 306 in the sequential process corresponds to "Process Step 1." After "Process Step 1" is successfully completed, the proper object 306 in the sequential process corresponds to "Process Step 2." If the proper object 306 in the sequential process is selected, process control management system 110 determines, at decision block 406, whether the one or more steps corresponding to the proper object 306 have been successfully completed. When the one or more steps corresponding to the proper object 306 have been successfully completed, process control management system 110 visually distinguishes the corresponding object 306 to indicate that the step has been successfully completed. One of ordinary skill in the art will appreciate that process control management system 110 may be configured to indicate successful completion of a step by visually distinguishing the corresponding object in a variety of ways. For example, process control management system 110 may change the display of the object 306 (e.g., by changing the color of the object 306, highlighting the object 306, etc.), place another object next to the object 306 (e.g., an object displaying a check mark in a box, a checked-box object), etc.

Referring again to block 404, if the proper object 306 in the sequential process is not selected, process control management system 110 determines, at decision block 408, whether an object 306 corresponding to a previously completed step has been selected. If an object corresponding to a previously completed step is not selected, the process is repeated at decision block 404. However, if an object corresponding to a previously completed step is selected, process control management system 110 determines, at decision block 410, whether the previously completed step is successfully completed again.

For example, consider the sequential process described above comprising "Process Step 1," "Process Step 2," "Process Step 3," and "Process Step 4." Upon initiation of process control management system 110, the proper object 306 in the sequential process corresponds to "Process Step 1." All other objects 306 would be considered improper objects in the sequential process. After "Process Step 1" and "Process Step 2" have been completed, the object 306 corresponding to "Process Step 3" would be the proper object 306 in the sequential process. As illustrated by decision block 404, at this point in the sequential process, if the object 306 corresponding to "Process Step 1" is selected again, process control management system 110 would recognize this as an improper object 306 in the sequence. Accordingly, at decision block 408, process control management system 110 would determine that "Process Step 1" is a previously completed step.

Referring again to decision block 410, when the previously completed step is successfully completed again, process control management system 110 performs a series of functions. First, at decision block 412, process control management system 110 determines whether any other previously completed steps are dependent on the changes made to the current previously completed step. For any previously completed steps that do have a dependency, at block 414, process control management system 110 visually distinguishes the corresponding object 306. Process control management system 110 may visually distinguish these objects 306 in a variety of ways to indicate that the corresponding steps needs to be completed again because of the dependency.

In the above example, "Process Step 2" and "Process Step 4" may be dependent on "Process Step 1." For instance, during completion of "Process Step 1," certain information may be received by process control management system 110, which is used during "Process Step 2" and "Process Step 4." Because of this dependency, when this information is changed while "Process Step 1" is being completed again, it may be necessary to repeat "Process Step 2" and/or "Process Step 4." Thus, process control management system 110 may visually distinguish the objects 306 corresponding to these dependent steps to indicate to a user that they should be repeated. Furthermore, process control management system 110 may be configured such that the dependent steps must be completed in the appropriate order.

For example, as represented by decision blocks 416 and 418, process control management system 110 may determine whether the previously completed and dependent steps are successfully completed in the proper sequence. If the previously completed and dependent steps are successfully completed in the proper sequence, process control management system 110 may terminate at block 420. Furthermore, as each previously completed and dependent step is successfully completed again in the proper sequence, process control management system 110 may visually distinguish the corresponding object 306, as described above, to indicate successful completion.

Figure 5:
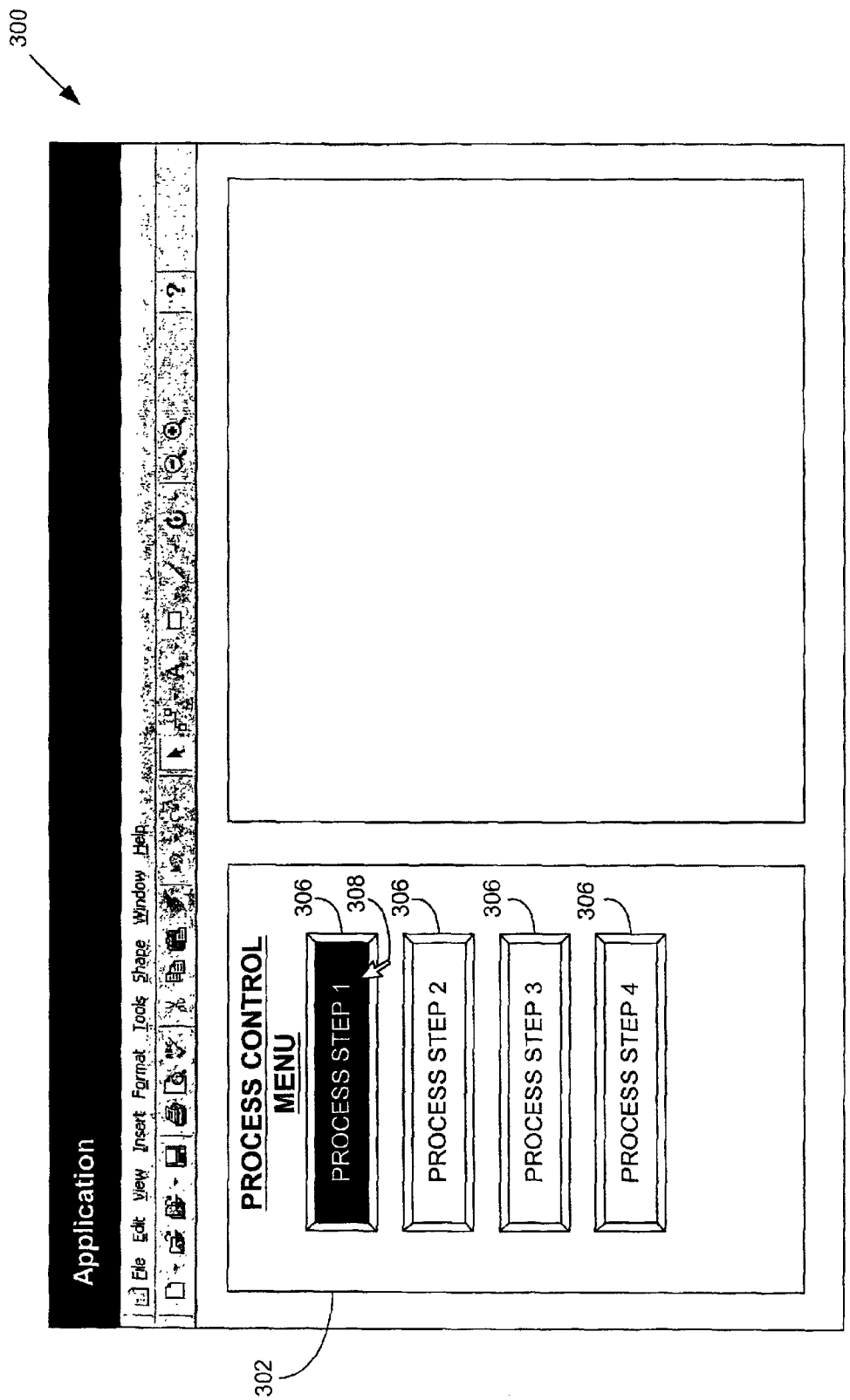
FIG. 5 illustrates the screen shot of FIG. 2 in which an object corresponding to "Process Step 1" has been selected by a user.

With reference to the screen shots of FIGS. 5–11 of a representative graphical user interface, a particular embodiment of process control management system 110 will be described. In this example, process control management system 110 may be used to control a sequential process comprising the following steps: "Process Step 1," "Process Step 2," "Process Step 3," and "Process Step 4." As illustrated in FIG. 5, process control management system 110 may provide a process control menu 302, in which four objects 306 are displayed, each corresponding to one of the steps in the process. As illustrated in FIG. 5, when initiated, process control management system 110 enables a user to select the proper object 306 ("Process Step 1") via cursor 308. Process control management system 110 may be configured to change the display of the objects 306 when they are selected by a user, such as by changing the color of the object 306.

Figure 6:
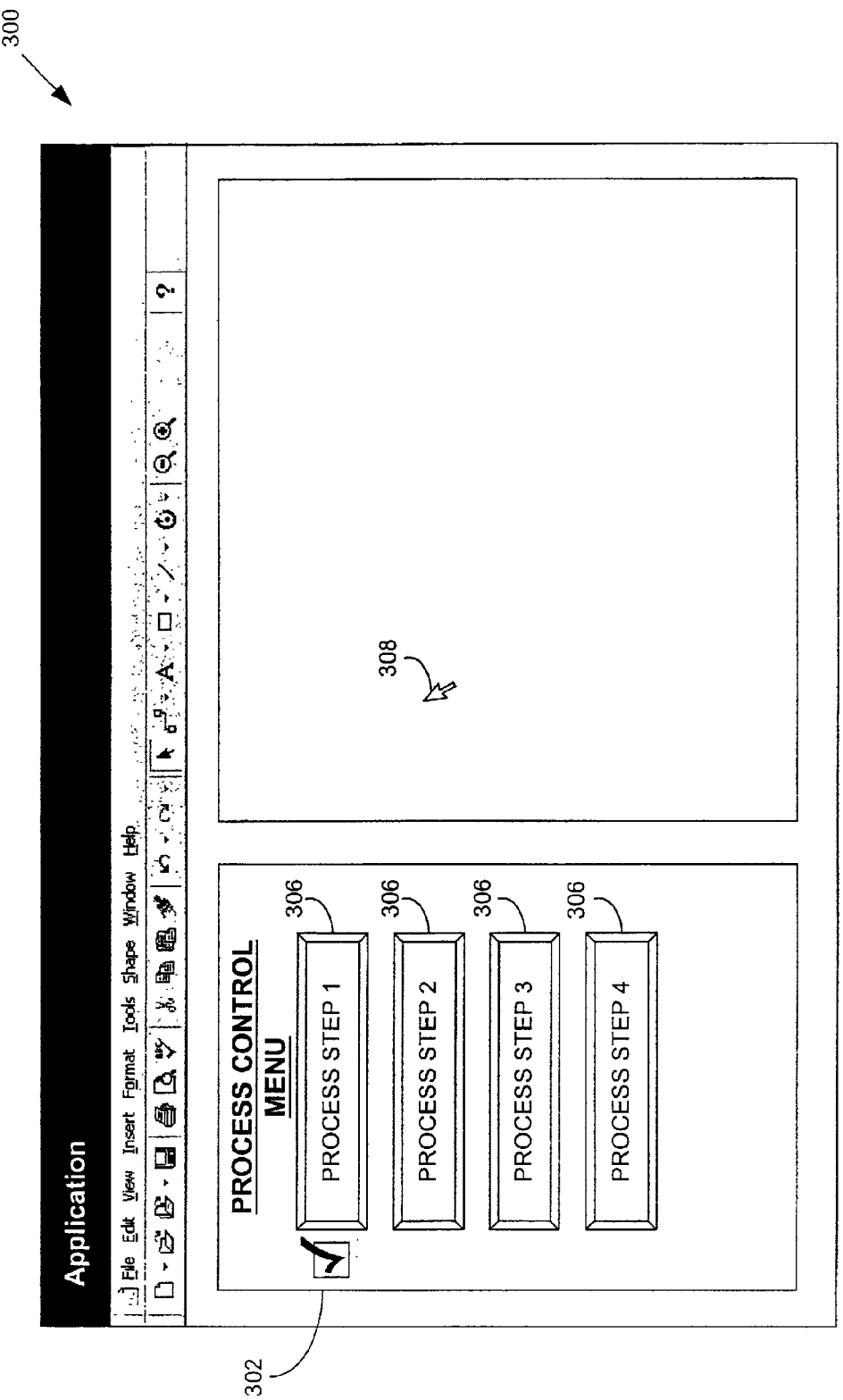
FIG. 6 illustrates the screen shot of FIG. 5 in which the object corresponding to "Process Step 1" has been visually distinguished by displaying a checked-box object to indicate that the step has been successfully completed.

As illustrated in FIG. 6, after the corresponding step has been successfully completed, process control management system 110 may visually distinguish the corresponding object 306 to indicate that the step has been successfully completed. In the embodiment illustrated in FIG. 6, process control management system 110 visually distinguishes completed steps by displaying a checked-box object next to the corresponding object 306. As stated above, many other methods may be employed for visually distinguishing objects 306.

Figure 7:
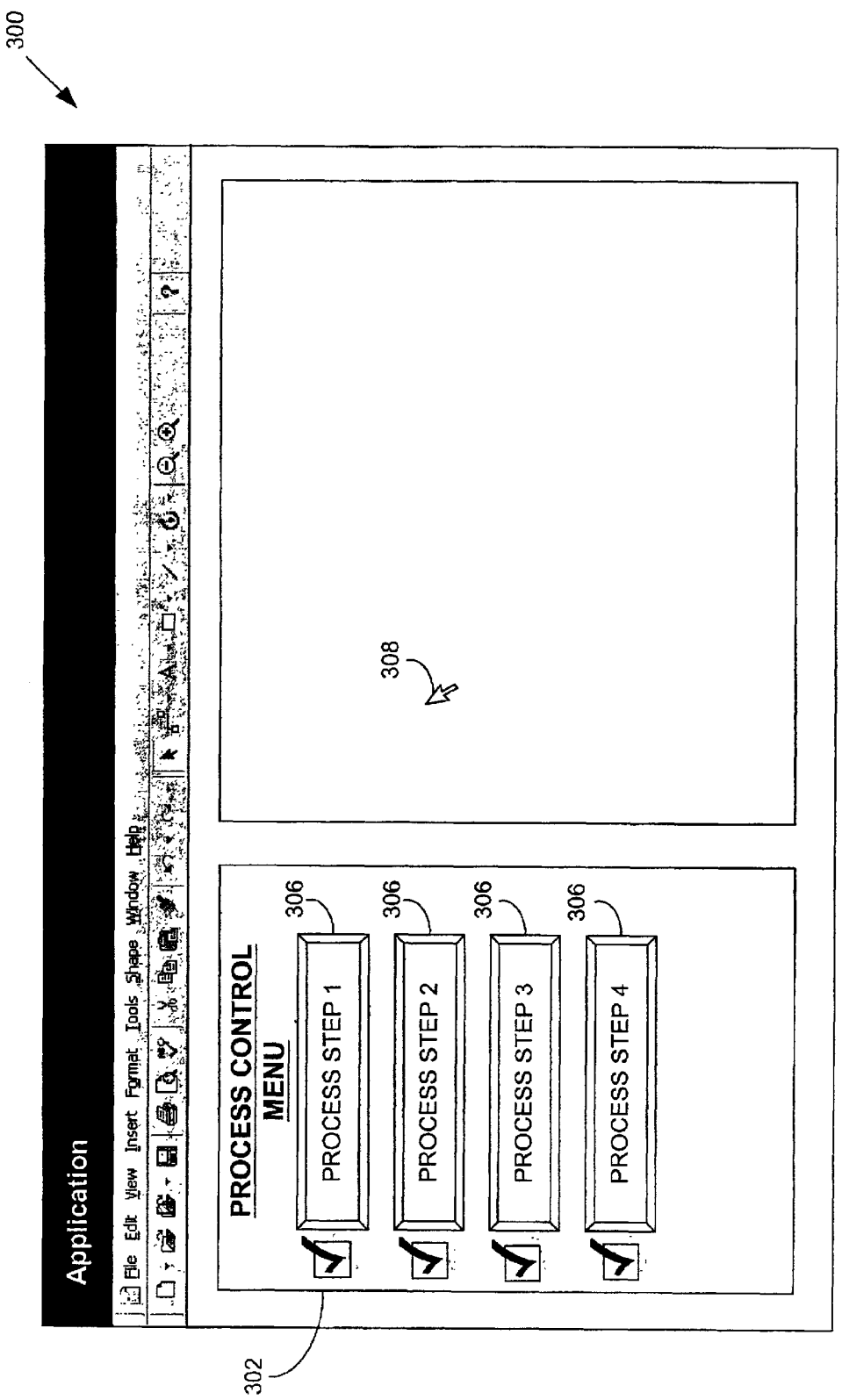
FIG. 7 illustrates the screen shot of FIG. 6 in which the objects corresponding to "Process Step 2," "Process Step 3," and "Process Step 4" have also been visually distinguished by displaying a checked-box object to indicate that the corresponding step has been successfully completed.
Figure 8:
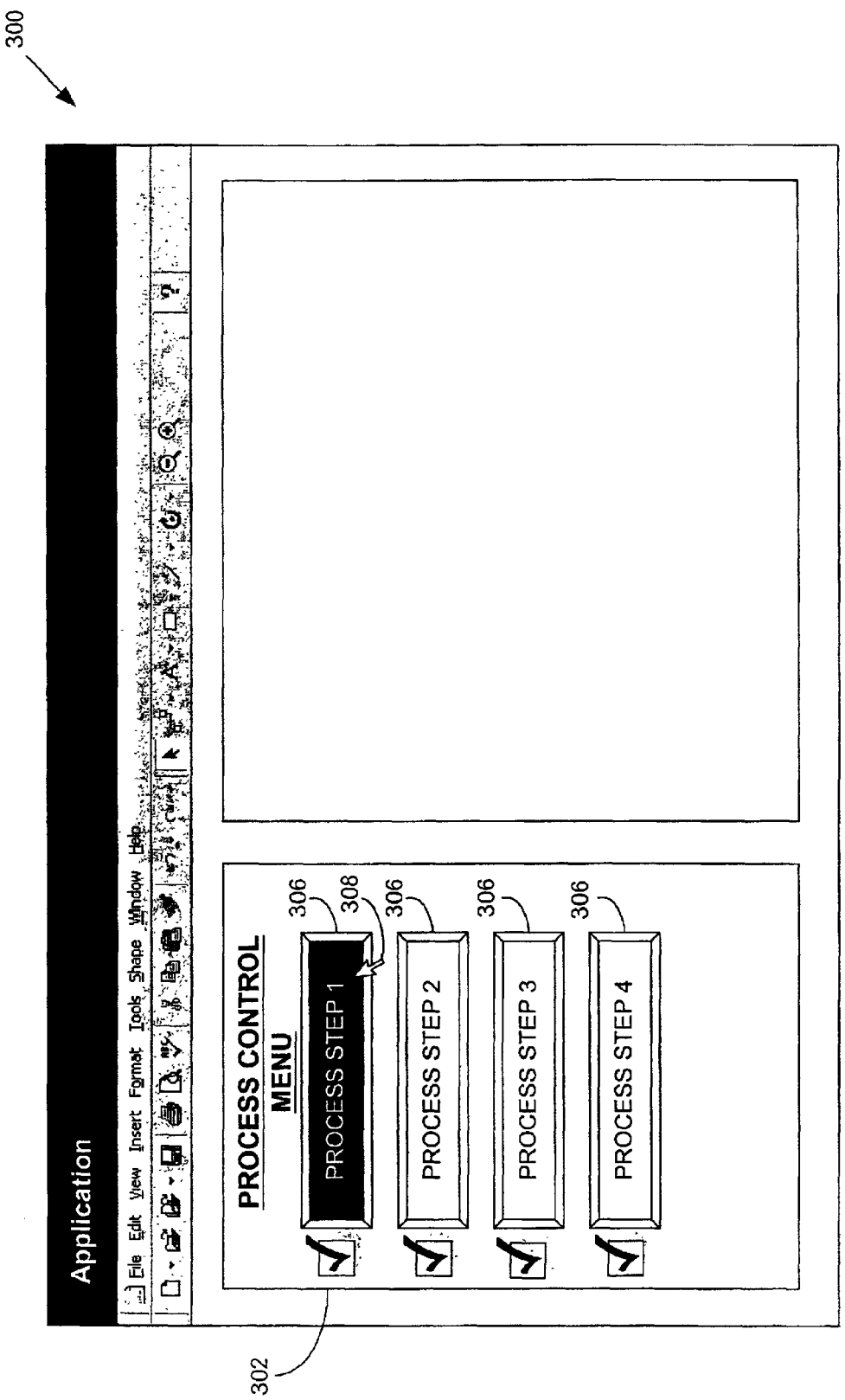
FIG. 8 illustrates the screen shot of FIG. 7 in which the object corresponding to the previously completed step "Process Step 1" has been reselected by the user.
Figure 9:
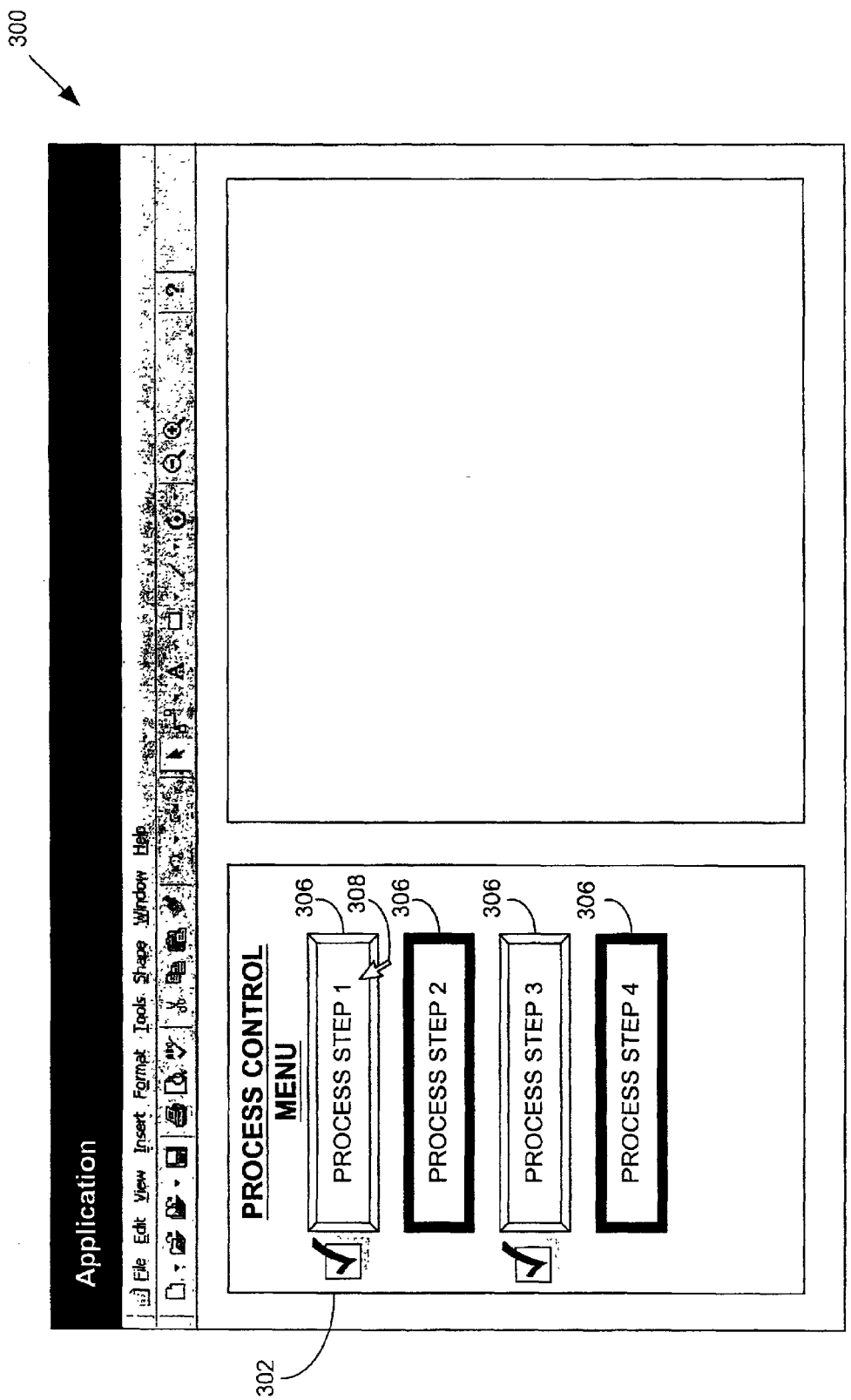
FIG. 9 illustrates the screen shot of FIG. 8 in which the previously completed "Process Step 1" has been successfully completed again and in which the objects corresponding to previously completed steps "Process Step 2" and "Process Step 4" have been visually distinguished by removing the checked-box object and highlighting the border of the object to indicate that the corresponding step is to be completed again.

In FIG. 7, all of the steps have been successfully completed and process control management system 110 has displayed a checked-box object next to each of the objects 306 to indicate that they have been successfully completed. As discussed above, process control management system 110 enables a user to repeat previously completed steps by selecting the corresponding object 306. In the embodiment illustrated in FIG. 8, a user has selected the object 306 corresponding to "Process Step 1," which was previously completed. After "Process Step 1" is successfully completed again, process control management system 110 may determine whether any other previously completed steps ("Process Step 2," "Process Step 3," and "Process Step 4") are dependent on the changes made to the current previously completed step ("Process Step 1"). Process control management system 110 may visually distinguish the object 306 corresponding to the previously completed steps that do have a dependency. Process control management system 110 may visually distinguish these objects 306 in a variety of ways to indicate that the corresponding step needs to be completed again because of the dependency. In the embodiment illustrated in FIG. 9, process control management system 110 has determined that "Process Step 2" and "Process Step 4" do have a dependency on "Process Step 1," which may require them to be successfully completed again. The display of the objects 306 corresponding to "Process Step 2" and "Process Step 4" have been modified by changing the color of the border of the object 306. Any of a variety of other methods may be employed.

Figure 10:
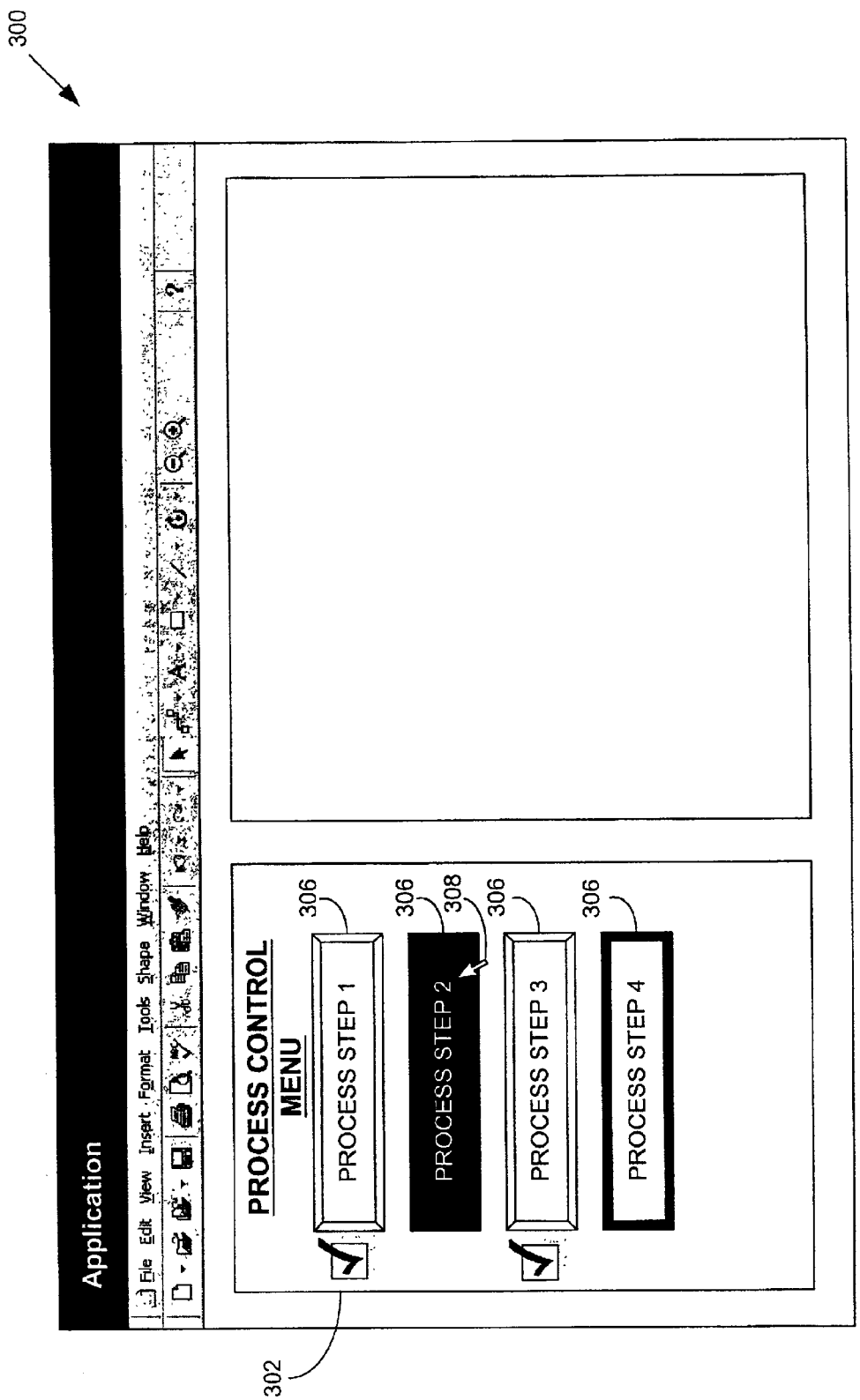
FIG. 10 illustrates the screen shot of FIG. 9 in which the object corresponding to "Process Step 2" has been reselected by the user.
Figure 11:
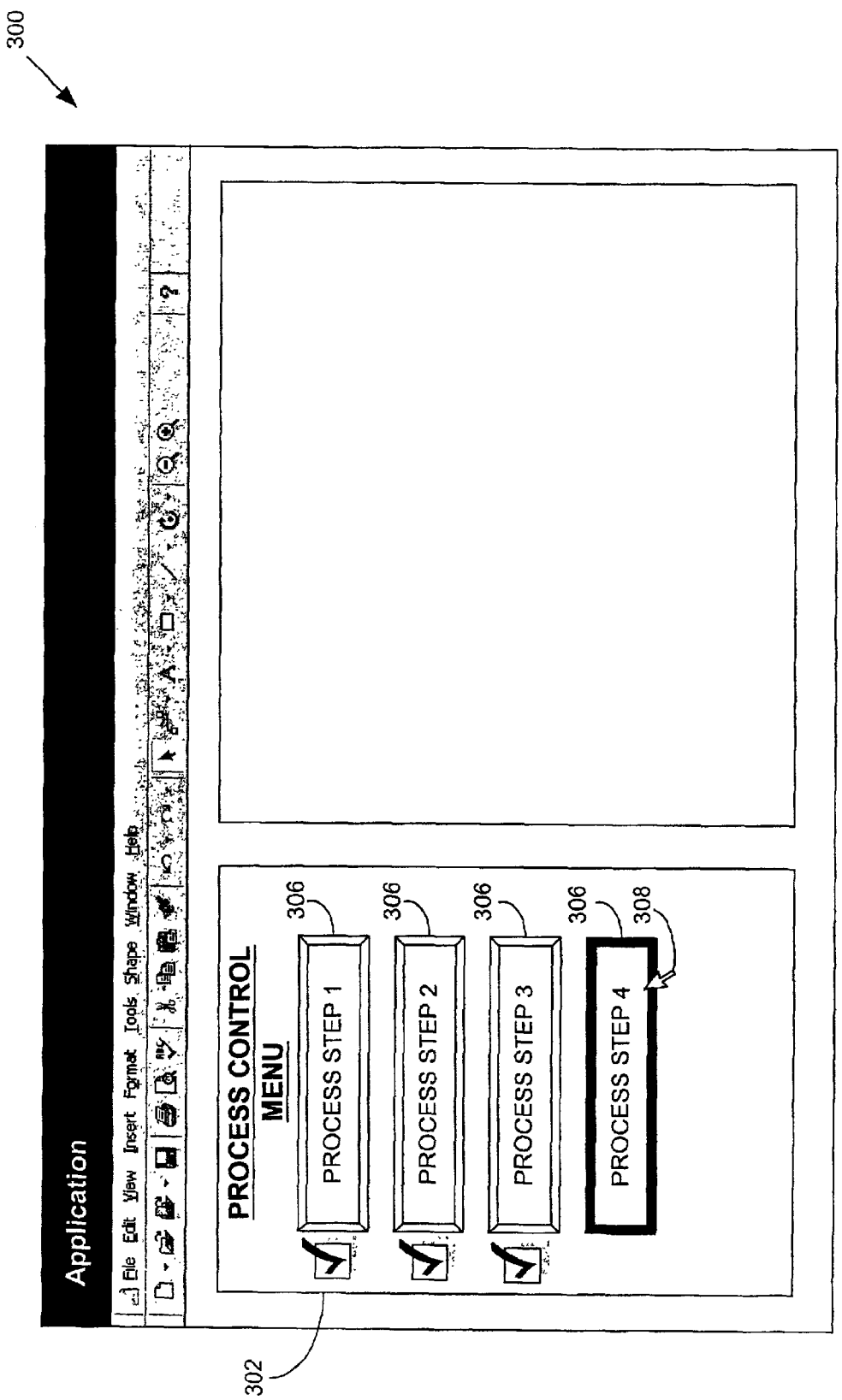
FIG. 11 illustrates the screen shot of FIG. 10 in which previously completed "Process Step 2" has been successfully completed again and has been visually distinguished by displaying a checked-box object to indicate that the step has been successfully completed.

After process control management system 110 determines the dependencies and visually distinguishes the objects 306 corresponding to the steps that need to be repeated, process control management system 110 may enable the user to repeat the dependent steps in the proper sequential order. For example, as illustrated in FIG. 10, process control management system 110 may enable the user to reselect the object 306 corresponding to "Process Step 2." As illustrated in FIG. 11, after "Process Step 2" is successfully completed again, process control management system 110 may display a checked-box object next to the corresponding object 306.

Figure 12:
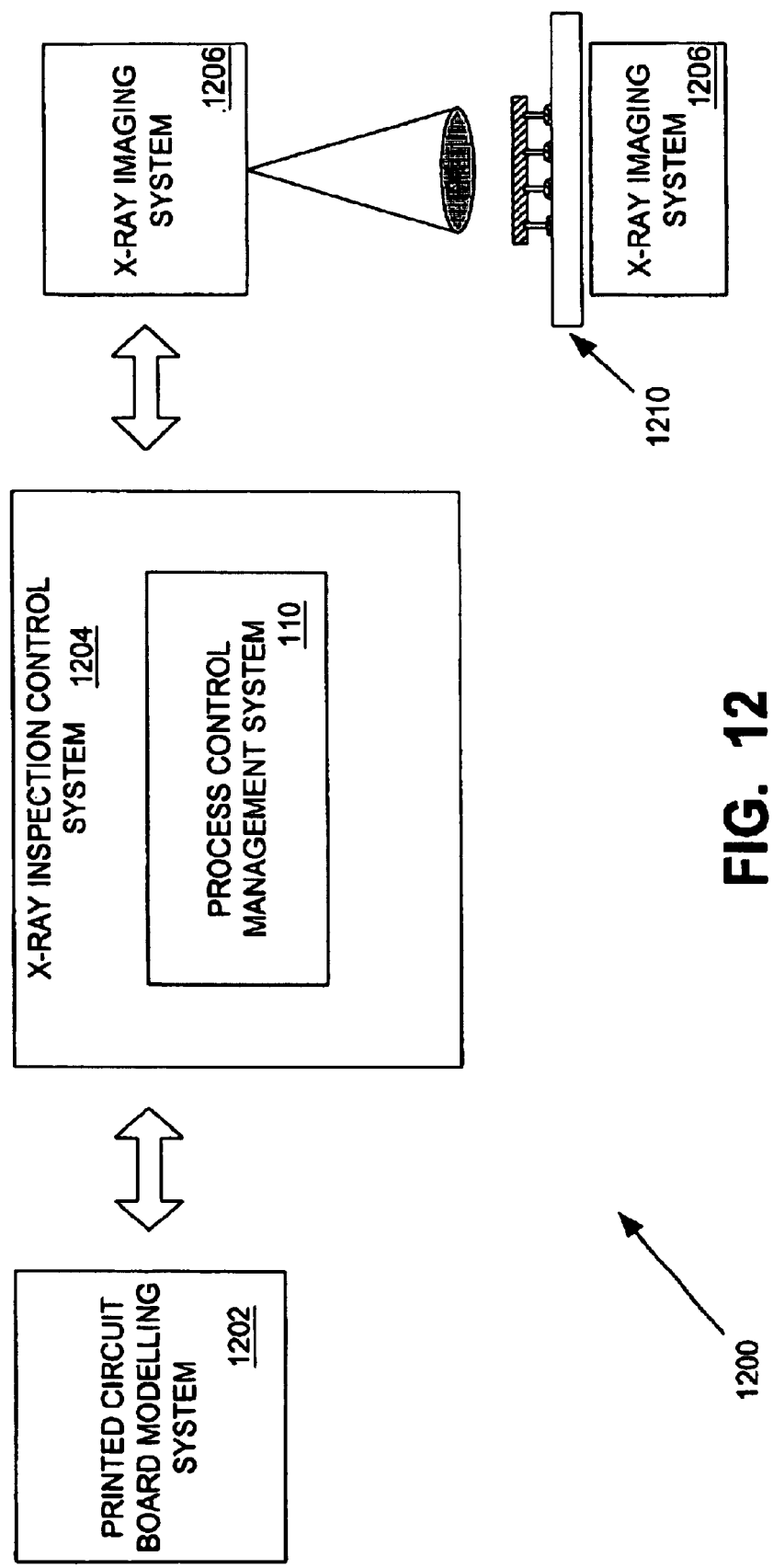
FIG. 12 is a block diagram of another embodiment of a system in which the process control management system of the present invention may be implemented.

Process control management system 110 may be implemented in a variety of other systems and/or a variety of computer applications. FIG. 12 is a block diagram of a system 1200 for inspecting manufacturing defects in printed circuit boards, in which process control management system 110 may be implemented. System 1200 comprises a printed circuit board modeling system 1202, an x-ray inspection control system 1204, an x-ray imaging system 1206, and a printed circuit board 1210. In general, PCB modeling system 1202 is a system for generating a computer model of a printed circuit board. PCB modeling system 1202 may be any known or later developed computer-aided design (CAD) system capable of modeling any type of printed circuit board.

FIGS. 13 and 14 illustrate cross-sectional diagrams of a printed circuit board 1210 that may be modeled using PCB modeling system 1202 and inspected using system 1200. As illustrated in FIG. 13, printed circuit board 1210 may comprise a component 1300 having one or more pins 1304. Component 1300 may comprise any type of electrical component for which it is desirable to solder to a PCB substrate 1302. PCB substrate 1302 includes an underlying integrated circuit (IC) that comprises a plurality of termination points 1306, which may be soldered to the pins 1304 during the manufacturing process.

As illustrated in FIG. 14, during the manufacturing process, component 1300 may be electrically connected to the termination points 1306 on the PCB substrate 1302 via a soldering material 1400. FIG. 14 illustrates printed circuit board 1210 after the soldering process. By way of example, during the manufacturing process a variety of defects may result. For instance, in FIG. 14, the left-most pin 1304 may have a soldering defect (represented by reference numeral 1402). One of ordinary skill in the art will appreciate that any of the following, or other, defects may occur during the manufacturing process: open solder joints, shorts, missing components, misaligned components, insufficient solder joints, excess solder joints, reversed capacitors, solder balls, solder voids, etc.

X-ray imaging system 1206 comprises imaging hardware and/or software for capturing an x-ray image of a manufactured printed circuit board. One of ordinary skill in the art will appreciate that system 1200 may employ any of a variety of other types of imaging techniques (e.g., optical, ultrasonic, thermal image, etc.). X-ray inspection control system 1204 interfaces with PCB modeling system 1202 and x-ray imaging system 1206. For instance, x-ray inspection control system 1204 may receive a file containing a computer model of a particular printed circuit board from PCB modeling system 1202. Based on the computer model, x-ray inspection control system 1204 may generate an inspection program to be implemented by x-ray imaging system 1206. The inspection program may be used to image a manufactured printed circuit board, which is based on the computer model generated by PCB modeling system 1202. After generating images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Figure 15:
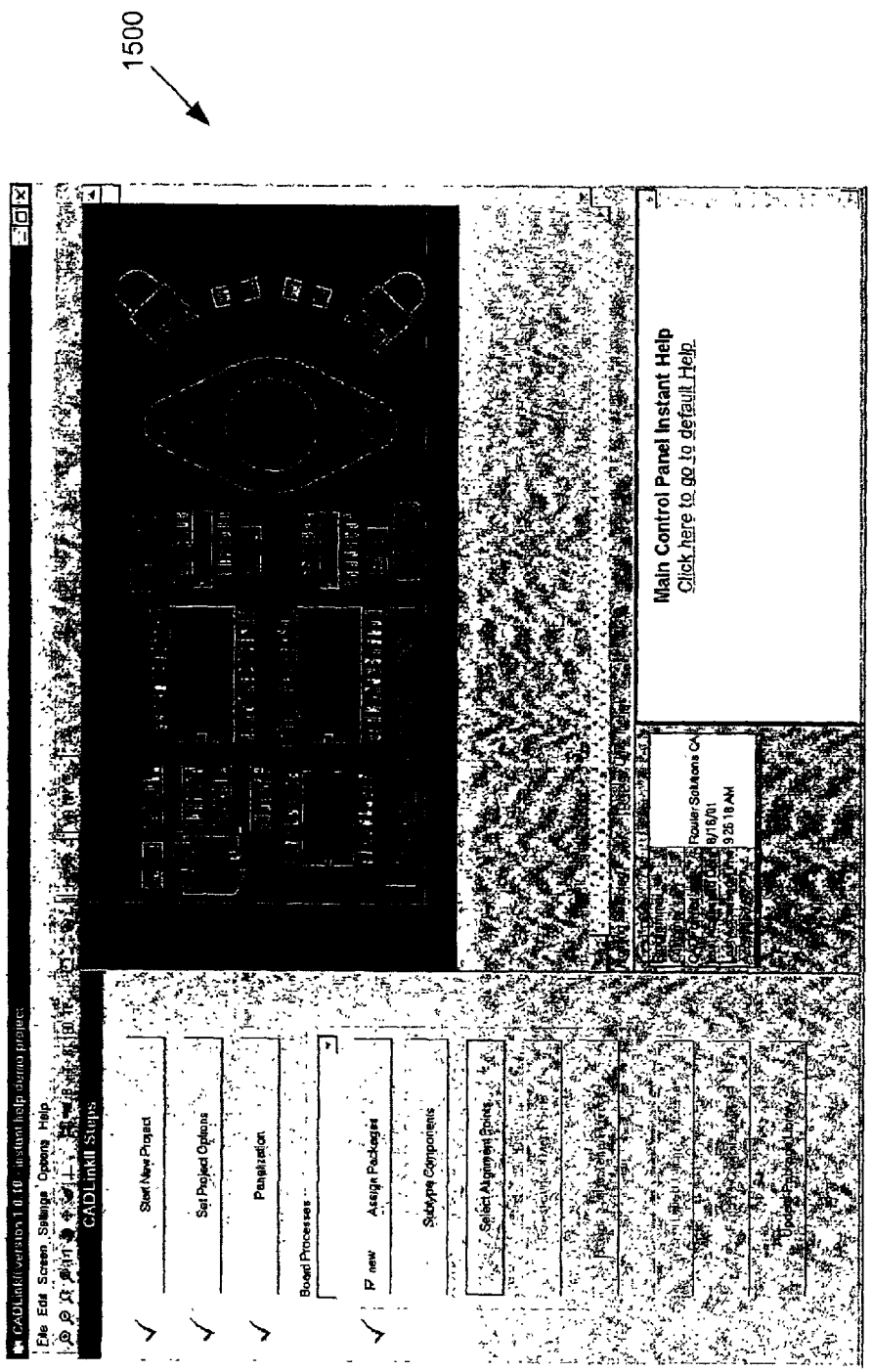
FIG. 15 is a screen shot of another embodiment of a graphical user interface illustrating the process control management system of FIGS. 1 and 4 implemented in the x-ray inspection control system of FIG. 12.

As illustrated in FIG. 12, x-ray inspection control system 1204 may implement process control management system 110 in order to improve the inspection process and facilitate generation of the inspection program provided to x-ray imaging system 1206. FIG. 15 is a screen shot 1500 of another embodiment of a graphical user interface illustrating process control management system 110 implemented in x-ray inspection control system 1204. In the embodiment illustrated in FIG. 15, process control management system 110 is configured to control the process of generating the inspection program that is provided to x-ray imaging system 1206. For example, as further illustrated in FIG. 15, process control management system 110 may display objects 306 corresponding to various steps in this process: "Start New Project," "Set Project Options," "Panelization," "Board Processes," "Assign Packages," "Subtype Components," "Select Alignment Points," "Select Surface Map Points," "Board Level Optional Processes," "Panel Level Optional Processes," "Export & Compile Data," "Update Package Library," etc.

It should be emphasized that the above-described embodiments of process control management system 110, particularly, any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A method for managing a sequential process using a graphical user interface, the method comprising:

displaying a plurality of selectable objects on a graphical user interface, each object corresponding to a step in a sequential process;

enabling a user to select one of the objects according to an order of steps of the sequential process;

enabling the user to complete the corresponding step of the selected object;

in response to completion of the corresponding step, visually distinguishing the object to indicate that the corresponding step has been successfully completed;

determining when a first previously completed step corresponding to a visually distinguished object has been selected again, and in response to selection of the first previously completed step:

enabling the user to change the first previously completed step;

in response to the first previously completed step being successfully completed again, determining whether a second previously completed step corresponding to another object is dependent on the changes made in the first previously completed step; and when the second previously completed step is dependent on the changes made in the first previously completed step, visually distinguishing the object corresponding to the second previously completed step to indicate that the second previously completed step is to be completed again.

2. The method of claim 1 further comprising:

enabling the user to complete the second previously completed step again and any other previously completed steps dependent on the changes made in the first previously completed step, wherein the previously completed steps are completed again in the order of steps of the sequential process.

3. The method of claim 2, further comprising:

visually distinguishing the object corresponding to the second previously completed step to indicate that the second previously completed step has been completed.

4. The method of claim 1, wherein:

visually distinguishing the object to indicate that the corresponding step has been successfully completed comprises displaying an indicator adjacent to the object; and visually distinguishing the object to indicate that the second previously completed step is to be completed again comprises removing the indicator.

5. The method of claim 1, wherein visually distinguishing the object comprises modifying the display of the object.

6. The method of claim 1, wherein the steps in the sequential process are related to controlling an automatic x-ray inspection system configured to detect manufacturing defects in printed circuit boards.

7. The method of claim 1, wherein the steps in the sequential process are related to controlling a process for preparing an income tax return.

8. The method of claim 1, further comprising:

determining whether all the steps in the sequential process have been successfully completed.

9. The method of claim 1, wherein enabling the user to complete the corresponding step further comprises opening a separate window on the graphical user interface.

10. The method of claim 1, wherein enabling the user to complete the corresponding step further comprises enabling the user to complete a plurality of sub-steps of the selected object.

11. A computer program embodied in a computer-readable medium for managing a sequential process using a graphical user interface, the computer program comprising logic configured to:
   display a plurality of selectable objects on a graphical user interface, each object corresponding to a step in a sequential process;
   enable a user to select one of the objects according to an order of steps of the sequential process;
   enable the user to complete the corresponding step of the selected object;
   in response to completion of the corresponding step, visually distinguish the object to indicate that the corresponding step has been successfully completed;
   determine when a first previously completed step corresponding to a visually distinguished object has been selected again, and in response to selection of the first previously completed step:
      enable the user to change the first previously completed step;
      in response to the first previously completed step being successfully completed again, determine whether a second previously completed step corresponding to another object is dependent on the changes made in the first previously completed step; and
      when the second previously completed step is dependent on the changes made in the first previously completed step, visually distinguish the object corresponding to the second previously completed step to indicate that the second previously completed step is to be completed again.

12. The computer program of claim 11, wherein the logic is further configured to:
   enable the user to complete the second previously completed step again and any other previously completed steps dependent on the changes made in the first previously completed step, wherein the previously completed steps are completed again in the order of steps of the sequential process.

13. The computer program of claim 12, wherein the logic is further configured to:
   visually distinguish the object corresponding to the second previously completed step to indicate that the second previously completed step has been completed.

14. The computer program of claim 11, wherein the logic is further configured to:
   visually distinguishing the object to indicate that the corresponding step has been successfully completed comprises displaying an indicator adjacent to the object; and
   visually distinguishing the object to indicate that the second previously completed step is to be completed again comprises removing the indicator.

15. A system for managing a sequential process using a graphical user interface, the system comprising:
   logic configured to:
      display a plurality of selectable objects on a graphical user interface, each object corresponding to a step in a sequential process;
      enable a user to select one of the objects according to an order of steps of the sequential process;
      enable the user to complete the corresponding step of the selected object;
      in response to completion of the corresponding step, visually distinguish the object to indicate that the corresponding step has been successfully completed;
      determine when a first previously completed step corresponding to a visually distinguished object has been selected again, and in response to selection of the first previously completed step:
         enable the user to change the first previously completed step;
         in response to the first previously completed step being successfully completed again, determine whether a second previously completed step corresponding to another object is dependent on the changes made in the first previously completed step; and
         when the second previously completed step is dependent on the changes made in the first previously completed step, visually distinguish the object corresponding to the second previously completed step to indicate that the second previously completed step is to be completed again;
   a processing device configured to implement the logic; and
   a display device configured to support the graphical user interface.

16. The system of claim 15, wherein the logic configured to visually distinguish the object comprises logic for modifying the display of the object.

17. The system of claim 15, wherein the system manages a sequential process related to controlling an automatic x-ray inspection system configured to detect manufacturing defects in printed circuit boards.

18. The system of claim 15, wherein the system manages a sequential process related to controlling a process for preparing an income tax return.

19. The system of claim 15, wherein the logic configured to enable the user to complete the corresponding step further comprises logic for opening a separate window on the graphical user interface.

20. The system of claim 15, wherein the logic configured to enable the user to complete the corresponding step further comprises logic for enabling the user to complete a plurality of sub-steps of the selected object.

* * * * *